(12) United States Patent
Sherlock et al.

(10) Patent No.: US 7,762,004 B2
(45) Date of Patent: Jul. 27, 2010

(54) INSPECTION TOOL FOR MEASURING BUCKET Z NOTCH POSITION

(75) Inventors: Graham D. Sherlock, Greenville, SC (US); Paul L. Kalmar, Zirconia, NC (US); Christopher E. Thompson, Danvers, MA (US); Benjamin E. Baker, Simpsonville, SC (US); Todd Moran, Greenville, SC (US)

(73) Assignee: General Electric Company, Schenectady, NY (US)

( * ) Notice: Subject to any disclaimer, the term of this patent is extended or adjusted under 35 U.S.C. 154(b) by 274 days.

(21) Appl. No.: 12/010,513

(22) Filed: Jan. 25, 2008

(65) Prior Publication Data

US 2009/0064520 A1 Mar. 12, 2009

Related U.S. Application Data

(60) Provisional application No. 60/898,400, filed on Jan. 31, 2007.

(51) Int. Cl.
*G01B 3/14* (2006.01)
(52) U.S. Cl. .......................................... 33/562; 33/645
(58) Field of Classification Search ........... 33/562–563, 33/533, 613, 645, 1 BB
See application file for complete search history.

(56) References Cited

U.S. PATENT DOCUMENTS

| | | | |
|---|---|---|---|
| 2,977,533 A * | 3/1961 | Savage | 324/71.1 |
| 5,133,643 A | 7/1992 | Ortolano | |
| 5,162,659 A | 11/1992 | Diamond | |
| 6,701,616 B2 | 3/2004 | Smith et al. | |
| 6,792,655 B2 | 9/2004 | Wah | |
| 6,842,995 B2 * | 1/2005 | Jones et al. | 33/645 |
| 6,906,808 B2 | 6/2005 | Trantow | |
| 6,910,278 B2 * | 6/2005 | Holder | 33/562 |
| 7,024,787 B2 * | 4/2006 | Varsell et al. | 33/562 |
| 7,328,496 B2 | 2/2008 | Powers et al. | |
| 7,337,520 B2 | 3/2008 | Jones et al. | |
| 7,412,780 B2 | 8/2008 | Holder | |

* cited by examiner

*Primary Examiner*—G. Bradley Bennett
*Assistant Examiner*—Tania C Courson
(74) *Attorney, Agent, or Firm*—Nixon & Vanderhye, P.C.

(57) ABSTRACT

An inspection tool for a turbine bucket shroud includes: a clamp device for clamping a dovetail portion of a turbine bucket; a template plate provided with an aperture defined by a edge shaped to conform to a specified shape of the turbine bucket shroud, wherein the template is moveable to a location over the turbine bucket shroud in a direction toward the clamp device, and wherein, at the location, the aperture represents a design specification location for the turbine bucket shroud relative to the dovetail portion of the bucket. A measurement gauge is provided for measuring gaps between edges of the shroud and edges of the template aperture.

20 Claims, 6 Drawing Sheets

INSPECTION TOOL FOR MEASURING BUCKET Z NOTCH POSITION

Priority is claimed from U.S. Provisional Application Ser. No. 60/898,400, filed Jan. 31, 2007.

BACKGROUND OF THE INVENTION

This invention relates to a tool for measuring Z-notch positions in a turbine bucket airfoil shroud.

Bucket airfoils twist and are often damaged by foreign object impact during operation. The Z-form profiles of bucket shrouds cannot therefore be measured relative to the original airfoil datum location points since these cannot be relied on to be in the original design specification position. Failure to control Z-form positions can result in uneven gaps between adjacent buckets such that when they reach temperature, they will bind and exert high axial stress on the bucket airfoils with the risk of catastrophic failure.

Crude gauges using a cookie cutter principle have been tried, but these devices did not provide accurate measurement of the bucket shroud position relative to design specifications. Rather, they were simple comparators that helped determine whether the profile of the shroud was correct.

BRIEF DESCRIPTION OF THE INVENTION

Described herein is a tool that obviates the need for assembly gap checks in the service center. Gap checks will still be needed at installation in the field but this should be a formality if the buckets are measured relative to original drawing and tolerances.

Accordingly, in one aspect, the present invention relates to a an inspection tool for a turbine bucket shroud comprising: a clamp device for clamping a dovetail portion of a turbine bucket; a template plate provided with an aperture defined by a edge shaped to conform to a specified shape of the turbine bucket shroud, wherein the template is moveable to a location over the turbine bucket shroud in a direction toward the clamp device, and wherein, at the location, the aperture represents a design specification location for the turbine bucket shroud relative to the dovetail portion of the bucket; and a measurement gauge for measuring gaps between edges of the shroud and edges of the template aperture.

In another aspect, the invention relates to an inspection tool for measuring Z-notch positions on a turbine bucket shroud comprising: an elongated base plate; a clamp device mounted on one end of the base plate for clamping a dovetail portion of a turbine bucket; a template locator plate moveably mounted on an opposite end of the base plate and supporting a shroud template plate for axial movement over a shroud portion of the turbine bucket, wherein the shroud template plate is formed with an aperture complimentary to a profile of the turbine bucket shroud including a pair of oppositely facing Z-notches conforming to Z-notches on the turbine bucket shroud; and one or more gauges for measuring gaps between the Z-notches on the turbine bucket shroud and the Z-notches defined by the aperture in the shroud template.

In still another aspect, the invention relates to a method of determining deviation from design specifications in the positions of Z-notches in a turbine bucket shroud comprising: providing a shroud template formed with an aperture complimentary to a profile of the turbine bucket shroud; locating the template over the turbine bucket shroud, with the template location representing the design specification location for the turbine shroud; and measuring gaps between edges of the turbine shroud and edges of the shroud template aperture.

The invention will now be described in detail in connection with the drawings identified below.

DETAILED DESCRIPTION OF THE INVENTION

Figure 1:
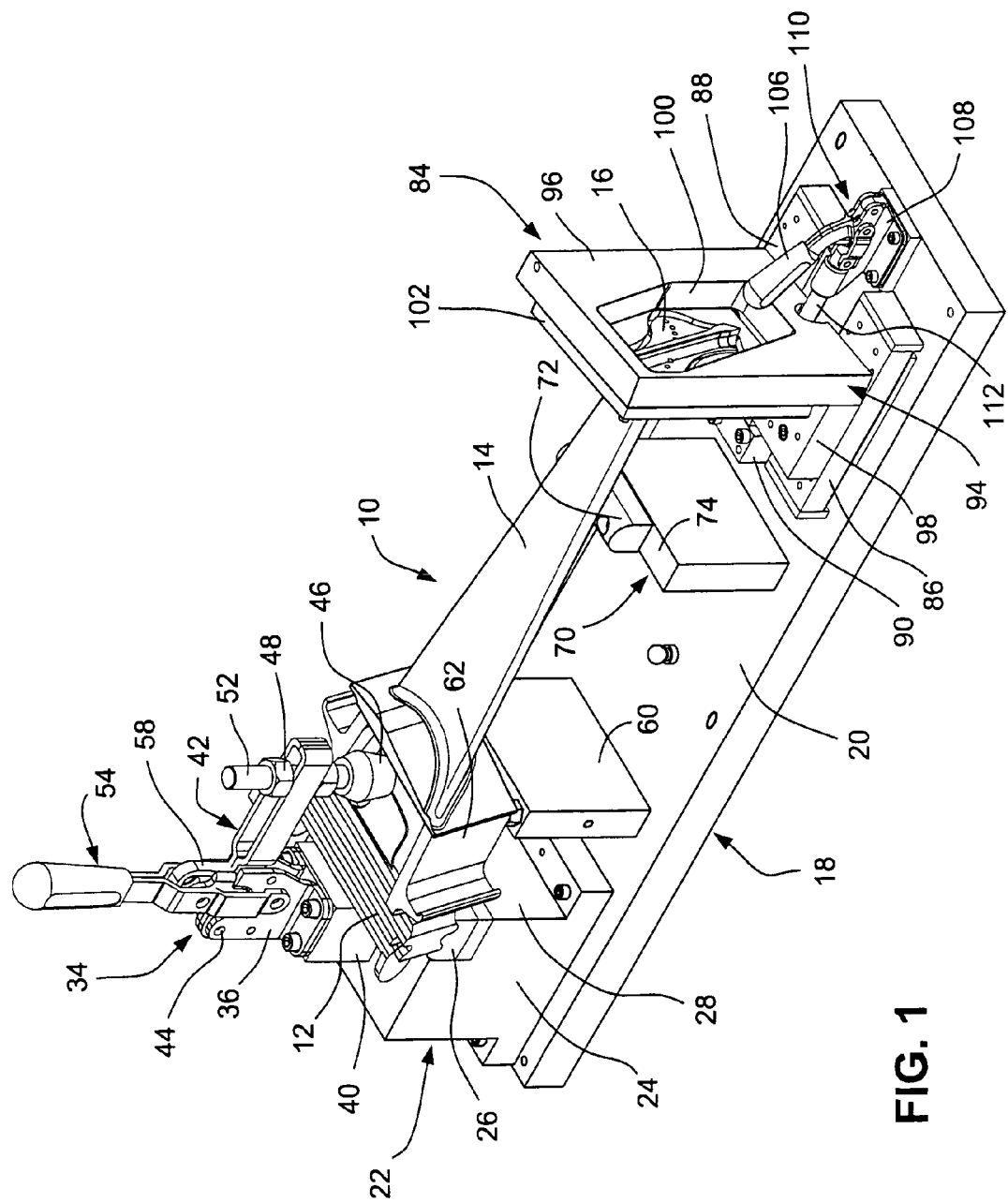
FIG. 1 is a perspective view of an inspection tool with a turbine bucket located thereon in accordance with an exemplary but non-limiting implementation of the invention.

With reference to FIG. 1, a turbine rotor bucket (or blade) 10 is shown supported on an inspection tool, described in detail further herein. The turbine bucket 10 is of conventional construction in that it includes a dovetail 12 by which the bucket is slidably mounted on the peripheral rim of a turbine rotor wheel, and an airfoil 14. In the exemplary embodiment, the tip of the airfoil 10 is provided with a tip shroud 16. The tip shroud profile, in plan, is shaped to include a pair of Z-notches that are not clearly visible in FIG. 1, but the shape of which can be gleaned from FIGS. 4 and 7. The Z-notches on the opposite sides of the turbine shroud are designed to engage complimentary Z-notches in shrouds of adjacent airfoils. It is the tool that enables measurement of the position of the Z-notches, and the determination of deviations from design specifications that is the subject of this invention.

FIGS. 1-7 illustrate one exemplary but non-limiting embodiment of an inspection tool 18 that facilitates inspection and measurement of the Z-notch positions of the turbine bucket tip shroud 16. More specifically, the tool 18 may include a rigid, elongated and rectangularly-shaped base plate 20. Supported on the base plate at one end thereof is a bucket dovetail clamp assembly 22. The assembly 22 includes a primary support block 24 secured to the base plate by screws or other suitable means. The block 24 in turn supports a dovetail rest block 26 extending laterally along a shoulder at the forward edge 28 of the primary support block 24. The dovetail rest block 26 may also be secured by screws or other suitable fasteners. Opposed lateral sides of the dovetail rest block are provided (or formed) with upstanding, radiused dowel surfaces 30, 32 that provide engagement surfaces receivable within the grooves of the turbine bucket dovetail when the bucket is located on the tool as shown in FIG. 1. A stop block 29 is secured to the side of the primary support block 24 and is provided with a hard stop 31 that is engaged by the dovetail when the latter is loaded onto the tool. The hard stop 31 thus accurately locates the bucket in the lateral direction while the dowel surfaces 30, 32 accurately locate the bucket in the linear or axial direction.

Also supported on the primary support block 24 is a vertical-handle clamp 34. The clamp 34 includes a pair of upstanding angle plates 36, 38 secured to the upper surface of a clamp riser 40 such that a space between the angle plates receives a clamp lever 42 that is pivotally fixed via pin 44 to the rearward ends of the angle plates. The opposite end of the lever 42 supports a clamp cap 46 adapted to engage and clamp the turbine bucket shank portion as described further herein. The clamp cap 46 is preferably formed of urethane and is adjustable relative to the lever by means of adjustment nuts 48, 50 threadably secured to a shaft 52 to which the cap 46 is secured. Note that the lever 42 is constructed by bending a strap back on itself, with an open slot between the parallel strap portions, thus permitting the shaft 52 to be located therebetween and held in place by the adjustment nuts 48, 50. A handle 54 is pivotally secured to the angle plates 36, 38 via pin 56 and engages an upstanding slotted projection 58 of the lever 42 such that counterclockwise rotation of the handle 54 will cause the lever 42 to also rotate in the same direction, lifting the urethane cap 46 away from the bucket. Rotation in the opposite or clockwise direction will move the cap 46 downwardly into clamping engagement with the shank portion 62, adjacent the dovetail 12. The clamp described above is exemplary only, and may be one of many suitable, commercially available cam-lock or other clamps as will be appreciated by one skilled in the art. As such, no further discussion of the clamp assembly is required.

A second bucket support block 60 is fixed to the base plate 20 by any suitable means. This support block is located in axially spaced relationship to the primary support block 24, and located such that it is engaged by the shank portion 62 of the bucket (located radially between the dovetail 16 and the airfoil 14. Laterally spaced screw heads 64, 66 provide "rest buttons" for the shank portion 62.

A third bucket support block 70 is secured to the base plate and provides support for the airfoil 14. A radiused tangent support cap 72 is resiliently mounted on a surface 74 of the support block 70 via screws 76, 78 and a pair of coil springs 80, 82, best seen in FIGS. 2 and 6. This support block facilitates loading of the bucket, but once the clamp 34 is fully engaged, the support cap 72 engages the airfoil in a "neutral buoyancy" or floating state with no upward bias applied to the airfoil.

Figure 4:
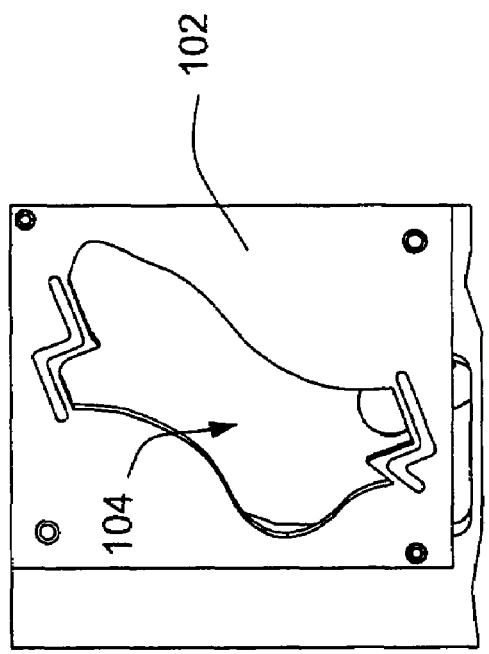
FIG. 4 is a section taken along the line 4-4 in FIG. 2.

At the end of the base opposite the base plate 20, there is a bucket shroud template assembly 84 supported on a pair of laterally spaced, axially extending linear guides 86, 88. The guides are adjustably fixed to the base plate 20. At the ends of the guides closest to the third support block 70, a second stop block 90 having a stop pad 92 is adjustably secured to the base plate, between the guides. The shroud template assembly 84 also includes a substantially L-shaped template locator plate 94 having a vertical plate portion 96 extending upwardly from a horizontal base portion 98 that projects towards the third support block 70. The template locator plate 94 is slidable axially along the linear guides 86, 88, with ribs or rails (not shown) provided on the bottom of the locator plate received in slots formed in the linear guides. The template locator plate 94 is formed with an opening or aperture 100 of trapezoid shape larger than the bucket tip shroud 16 to be measured. As best seen in FIG. 4, a template plate 102 is attached to the inner side of the vertical plate portion 96 of the locator plate 94. The template plate 102 is formed with an aperture 104 defined by a peripheral edge that is shaped to conform to the profile in plan of the tip shroud 16. The dimensions of the aperture 104 are slightly larger than the dimensions of the tip shroud (i.e., with predetermined clearances) so that the template locator plate 94 can move inwardly with the shroud 16 received in the aperture 104. Because the aperture 104 is fully within the boundary of the locator plate aperture 100, easy access is provided for the measuring procedure as can be appreciated from FIG. 1 and as further described below.

Figure 2:
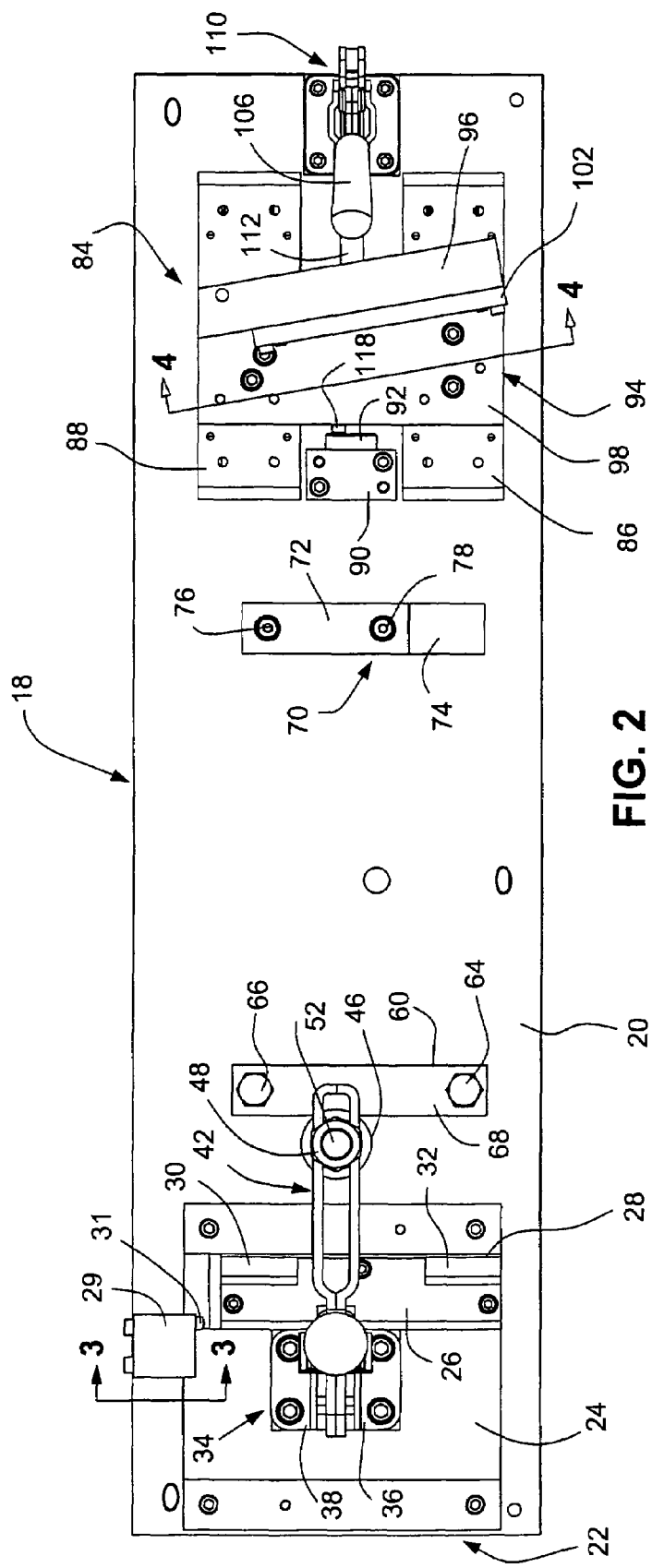
FIG. 2 is a plan view of FIG. 1, but with the turbine bucket removed.
Figure 3:
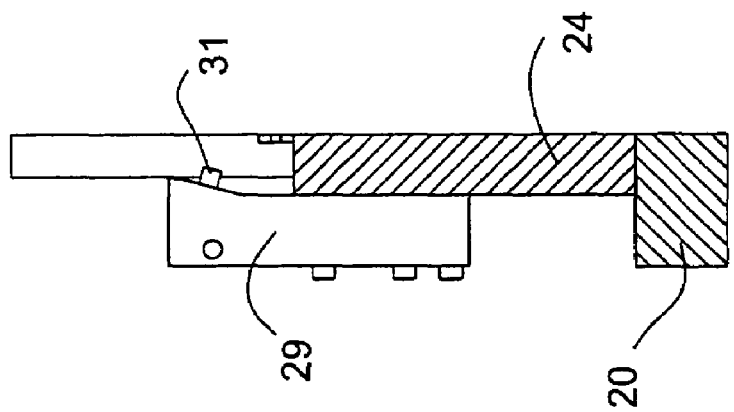
FIG. 3 is a section taken along the line 3-3 in FIG. 2.
Figure 5:
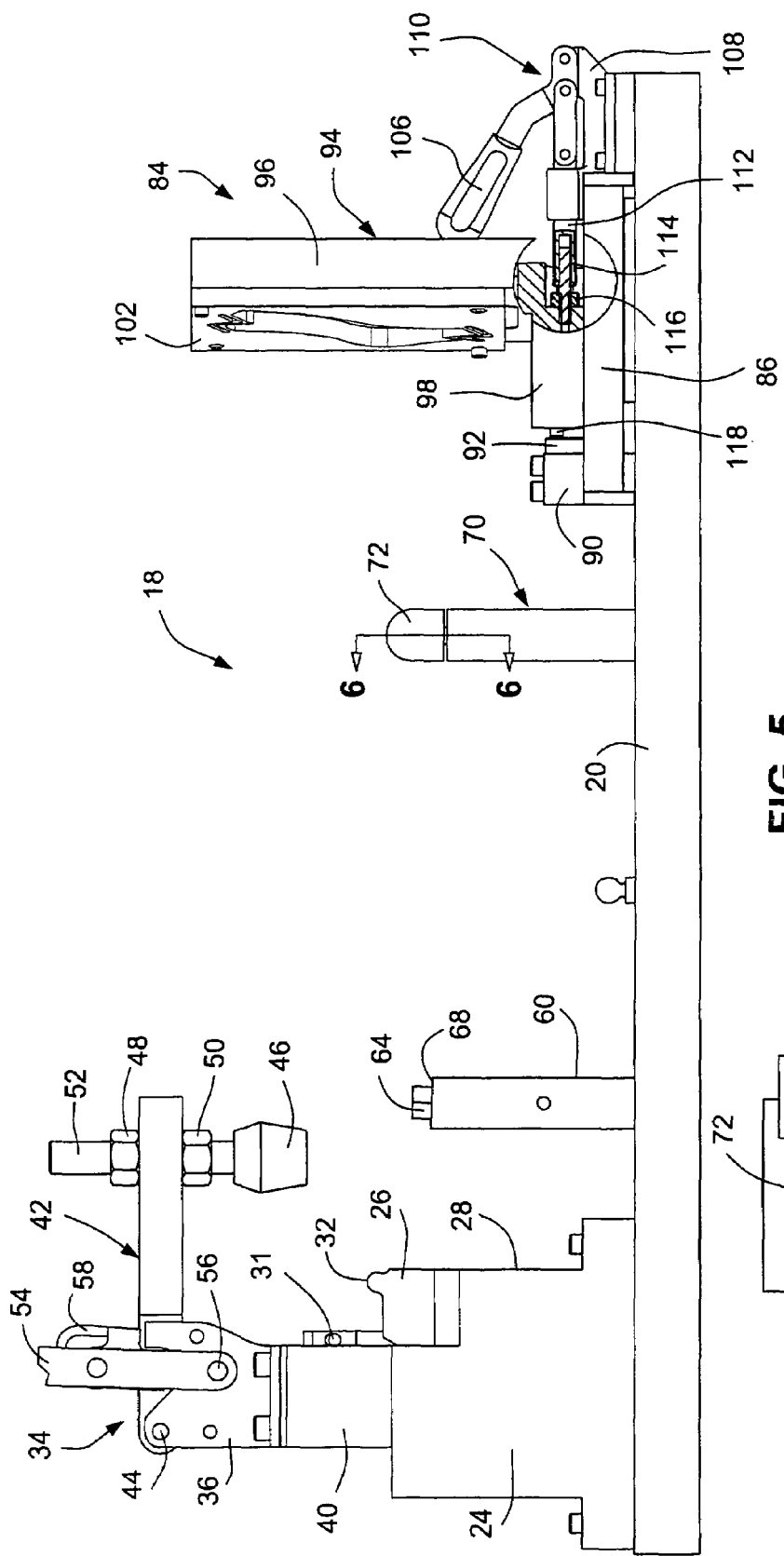
FIG. 5 is a side elevation of FIG. 1, but with the turbine bucket removed.
Figure 6:
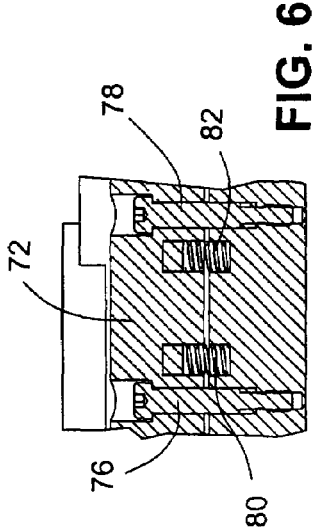
FIG. 6 is a section taken along the line 6-6 of FIG. 5.

Movement of the bucket shroud template assembly 84 is effected by means of any suitable, commercially available device, such as the linear or straight line clamp shown in FIGS. 1-3. The linear clamp assembly includes a handle 106 pivotally mounted to a base block 108 and connected via a known linkage arrangement 110 to a rod 112 moveable towards and away from the second stop block 90. As best understood from FIG. 2, the rod 112 mounts a threaded stud 114 that is adjustably threaded into the horizontal base portion 98 of the template locator plate 94, and locked by a hex nut 116. It will be appreciated that rotation of the handle 106 in a clockwise direction as viewed in FIG. 2 will move the template locator plate 94 to the right, away from the turbine bucket shroud 16. Conversely, rotation of the handle 106 in a counterclockwise direction will move the template locator plate 94 (and hence the template plate 102) inwardly and over the turbine bucket shroud 16. Note that in the clamped position shown in FIGS. 1 and 2, a forward button 118 projecting from the forward edge of the horizontal portion 98 of the template locator plate 94 is pressed against the stop pad 92.

It will be appreciated that the template locator plate 94 and template plate 102 are angled relative to the longitudinal axis of base plate 20 to accommodate the twist at the radially outer end of the bucket airfoil 14.

It will also be appreciated that the shroud template assembly 84 (and hence the template plate 102 and its aperture 104) may be precisely located relative to the dovetail clamp assembly 22 and the bucket dovetail 12 such that the template aperture 104 represents the design specification location for the bucket tip shroud 16 relative to the bucket dovetail 12. As a result, by measuring the gap between the shroud edge and the template aperture edge, deviations from the design specifications can be measured.

Figure 7:
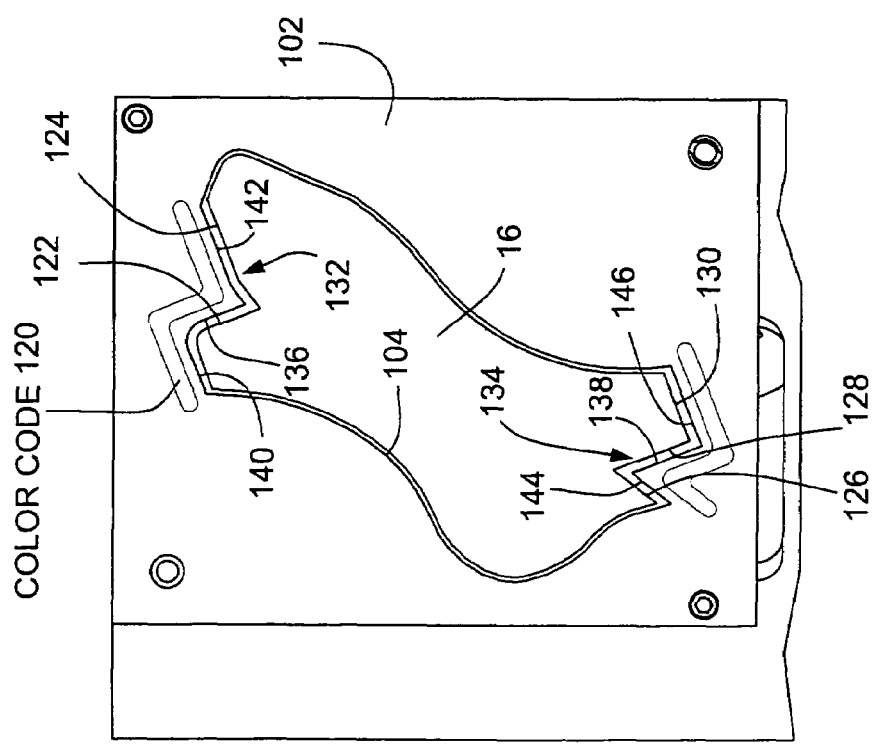
FIG. 7 is a partial end view illustrating a shroud template located over a turbine bucket shroud.

For purposes of this invention, and with reference to FIG. 7, the critical measurements are those along the three edge surfaces 120, 122, 124 and 126, 128 and 130 of the pair of Z-notches 132 and 134, respectively on opposite sides of the turbine bucket shroud 16. The Z-notch engagement surfaces 122 and 128 are most critical and have tighter tolerances, while adjacent surfaces 120 and 124 of notch 132, and 126 and 130 of notch 134 have a less critical tolerance. To highlight the areas to be measured, it is beneficial to color code the template plate along the Z-notch edges of the aperture. For example, edges 136 and 138 might be highlighted by an adjacent yellow or red stripe, while adjacent aperture edges 140, 142 and 144, 146 might be highlighted by adjacent blue (or other suitable color) stripes to remind the user where the critical measurements are to be taken.

Figure 8:
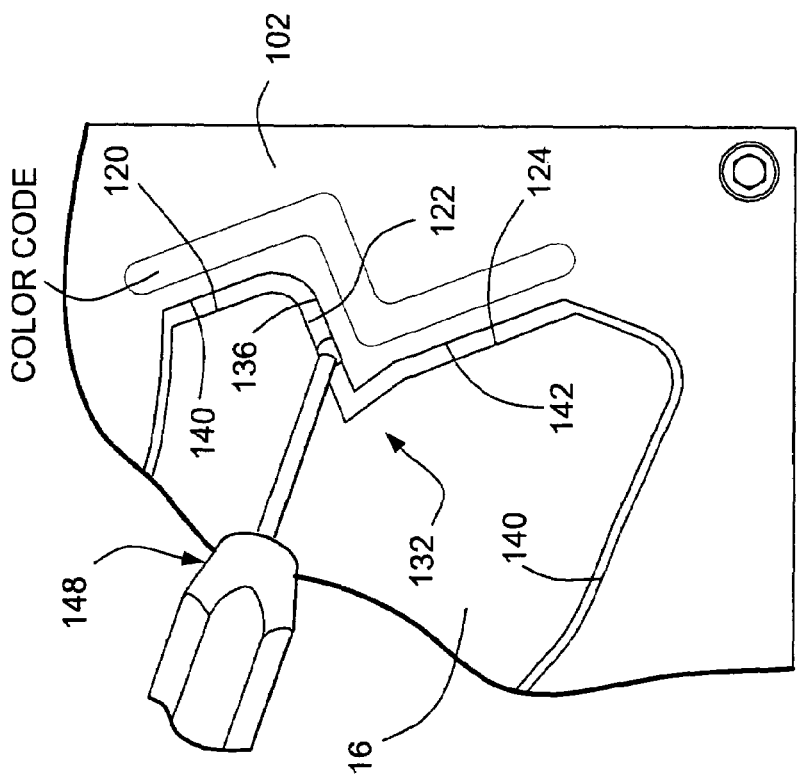
FIG. 8 is a partial perspective view illustrating the use of a conventional go/no-go ball gauge to measure a gap between the shroud edge and the template aperture edge.
Figure 9:
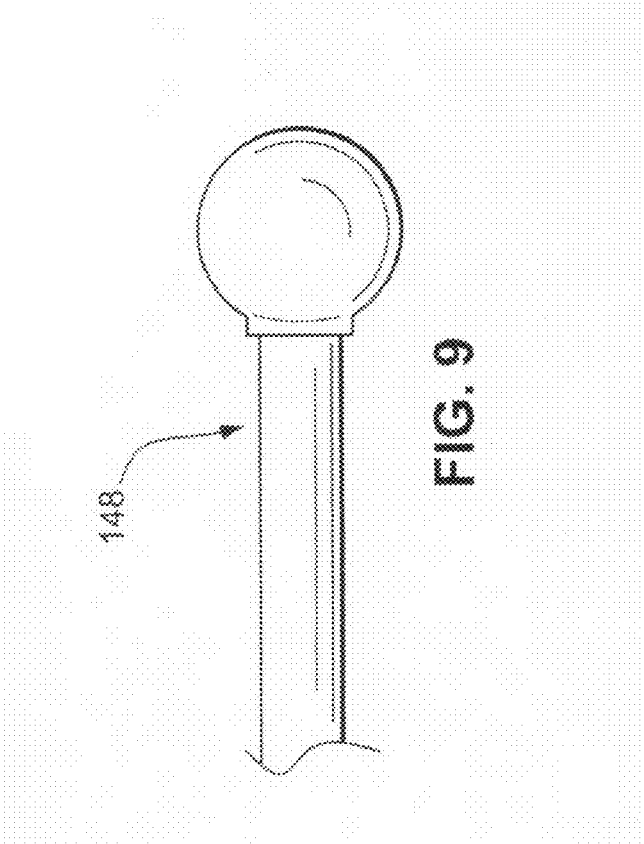
FIG. 9 is a partial view of a conventional go/no-go ball gauge that may be used to measure the gaps between the shroud edge and the template aperture edge.
Figure 10:
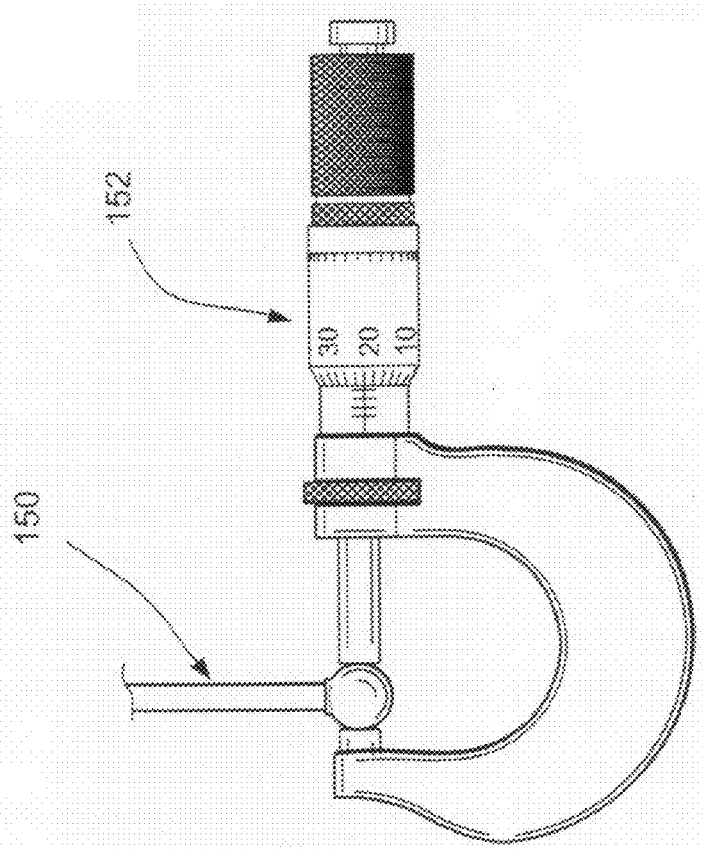
FIG. 10 illustrates the use of a micrometer to measure the width of an adjustable ball gauge.

To measure the gaps along the Z-notch surfaces, conventional go/no-go ball gauges 148 may be used, as shown in FIGS. 8 and 9. Alternatively, a conventional adjustable ball gauge 150 (with an adjustable ball diameter) may be used in combination with a micrometer 152 as shown in FIG. 10 for measuring the ball diameter after fitted engagement within the gap. Other suitable measuring techniques, whether manual or electronic, may be employed and are considered within the scope of the invention.

It will also be understood that template plates with differently-shaped apertures my be used with the template locator plate 94 for turbine buckets with differently-shaped shrouds.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An inspection tool for a turbine bucket shroud comprising:
    a clamp device for clamping a dovetail portion of a turbine bucket;
    a template plate provided with a template aperture defined by a edge shaped to conform to a specified shape of the turbine bucket shroud, wherein the template plate is moveable to a location over the turbine bucket shroud in a direction toward the clamp device, and wherein, at said location, said aperture represents a design specification location for the turbine bucket shroud relative to the dovetail portion of the bucket; and
    a measurement gauge for measuring gaps between edges of the shroud and edges of the template aperture.

2. The inspection tool of claim 1 wherein said clamp device comprises a first stationary member and a second moveable member, one of said first and second members having a clamping surface shaped to compliment a corresponding surface of the dovetail portion of the turbine bucket.

3. The inspection tool of claim 2 wherein said moveable member is provided with a urethane cap.

4. The inspection tool of claim 2 wherein said clamping surface of said clamp device locates the turbine bucket axially, and wherein a first stop on said clamp device locates the turbine bucket laterally.

5. The inspection tool of claim 4 wherein a second stop limits axial movement of said template plate.

6. The inspection tool of claim 1 wherein said template aperture is shaped to include a pair of opposed Z notches conforming with opposed Z notches in the turbine bucket shroud.

7. The inspection tool of claim 6 wherein said template plate is mounted for reciprocal movement toward and away from said turbine bucket shroud when said shroud is held in said clamp device.

8. The inspection tool of claim 7 wherein said template plate is moveable by means of a manually operable linear clamp.

9. The inspection tool of claim 1 wherein said measurement gauge comprises one or more go/no-go ball gauges.

10. The inspection tool of claim 1 wherein said measurement gauge comprises one or more adjustable ball gauges in combination with a micrometer.

11. The inspection tool of claim 1 and further comprising interchangeable template plates with apertures shaped to conform to differently designed turbine bucket shrouds.

12. The inspection tool of claim 1 wherein said clamp device and said template plate are supported on an elongated base plate, said clamp device supported on a primary support block attached to the base plate, and further wherein one or more additional support blocks are attached to said base plate axially between said clamp device and said template plate.

13. The inspection tool of claim 12 wherein said template plate is attached to a template locator plate slidably mounted on a pair of linear guides supported on dais base plate.

14. The inspection tool of claim 13 wherein said template locator plate is moveable axially along said linear guides to locate said template plate over the turbine bucket shroud.

15. The inspection tool of claim 13 wherein said one or more additional support blocks includes a second support block attached to said base plate, adapted to engage a shank portion of the turbine bucket.

16. The inspection tool of claim 15 wherein said one or more additional support blocks includes a third support block attached to said base plate, adapted to engage an airfoil portion of the turbine bucket.

17. The inspection tool of claim 16 wherein said third support block is provided with a spring-biased cap that provides neutral or un-biased support for the airfoil portion of the turbine bucket when the bucket dovetail is clamped in said clamp device.

18. An inspection tool for measuring Z-notch positions on a turbine bucket shroud comprising:
    an elongated base plate;
    a clamp device mounted on one end of said base plate for clamping a dovetail portion of a turbine bucket;
    a template locator plate moveably mounted on an opposite end of said base plate and supporting a shroud template plate for axial movement over a shroud portion of the turbine bucket, wherein the shroud template plate is formed with an aperture complimentary to a profile of the turbine bucket shroud including a pair of oppositely facing Z-notches conforming to Z-notches on the turbine bucket shroud; and
    one or more gauges for measuring gaps between the Z-notches on the turbine bucket shroud and the Z-notches defined by the aperture in the shroud template plate.

19. A method of determining deviation from design specifications in the positions of Z-notches in a turbine bucket shroud comprising:
    providing a shroud template formed with an aperture complimentary to a profile of the turbine bucket shroud;
    locating the shroud template plate over the turbine bucket shroud, with the shroud template plate aperture location representing the design specification location for the turbine shroud; and
    measuring gaps between edges of the turbine shroud and edges of the shroud template aperture.

20. The method of claim 19 wherein measuring gaps comprises measuring only those gaps at the Z-notches in the turbine bucket shroud.

* * * * *